May 24, 1932.  E. R. CARPENTER  1,860,231
METHOD OF AND DEVICE FOR EXCLUDING MOTHS OR OTHER INSECTS FROM CLOSETS
Filed March 10, 1931
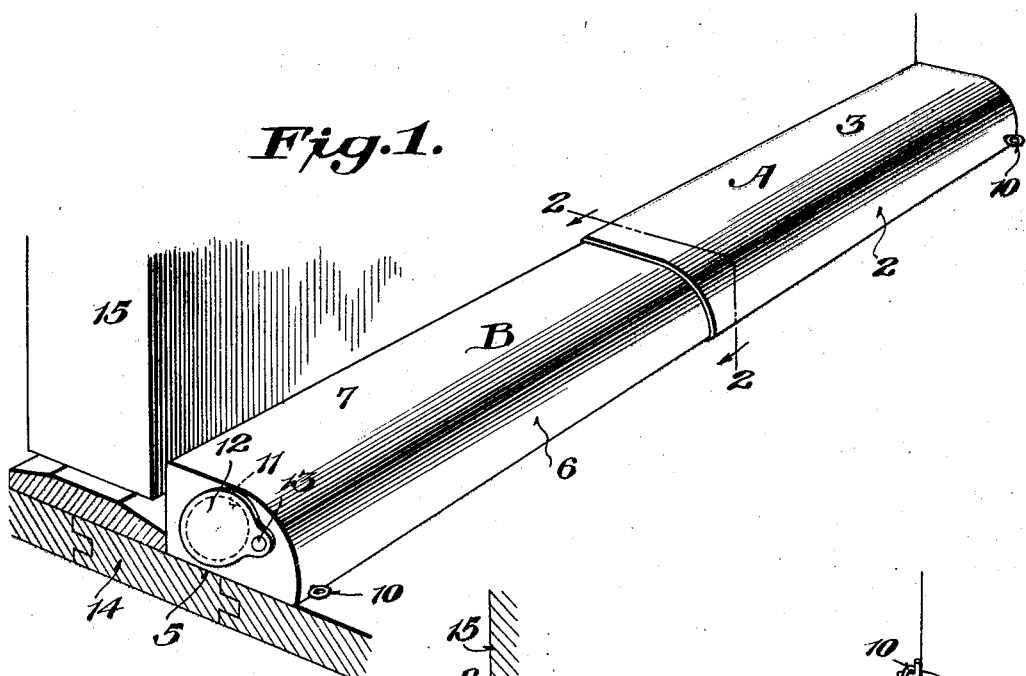
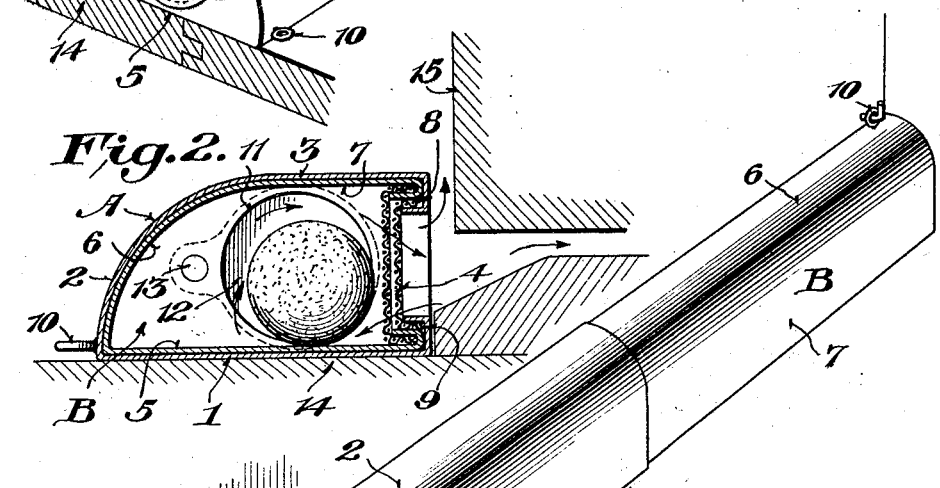
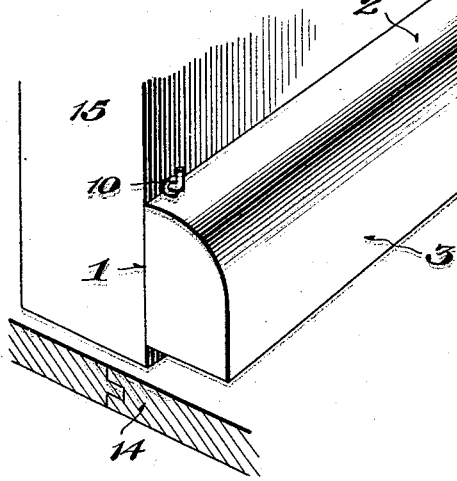
Inventor
Elliott R. Carpenter,
Attorneys Patented May 24, 1932

1,860,231

UNITED STATES PATENT OFFICE

ELLIOTT R. CARPENTER, OF COTUIT, MASSACHUSETTS

METHOD OF AND DEVICE FOR EXCLUDING MOTHS OR OTHER INSECTS FROM CLOSETS

Application filed March 10, 1931. Serial No. 521,594.

This invention relates to the protection of apparel and so forth against damage by moths or other insects, and has for its object to effectually prevent the entrance of such insects into closets as well as to protect the contents of closets against damage by such insects.

In my study of the habits of moths, I have discovered that moths enter closets through the crack or space below the bottom edge of the door and the floor or the threshold, if a threshold is present. Moths do not enter a closet over the top edge of a door or at the upright side edges of a door, possibly for the reason that the side edges and top edges of a door usually close against stop strips provided on a door frame.

To effectually prevent the entrance of moths or other insects into a closet through the space between the floor and the bottom edge of the door, I have conceived the idea of sealing the crack between the bottom edge of the door and the floor or threshold by means of a gas, repellent or obnoxious to moths or other insects, and to accomplish this result I have provided means for holding moth balls or other compositions which give off fumes that are repellant to moths or other insects, and which device will direct the gas or fumes directly into the crack below the bottom edge of the door and maintain the same entirely filled with the gas or fumes so as to effectually seal the same with the insect repellant gas.

In the accompanying drawings:

Figure 1 is a perspective view of a holder for moth balls or other insect repellent matter embodying the features of the present invention;

Figure 2 is a vertical sectional view illustrating the device in a closet;

Figure 3 is a similar view illustrating the device mounted upon the door of the close.

The device of the present invention includes telescopic members A and B, the member B telescoping within the member A. Each of the members is made of sheet metal, and the member A has a flat bottom 1, a back wall 2 which curves upwardly and forwardly into a substantially flat top 3. The front of the member is open and provided with a perforate or foraminous front wall 4. The member B has a flat bottom 5, a rear wall 6 and a substantially flat top 7 conforming respectively to the rear wall 2 and the top 3 of the member A and a perforate or foraminous front wall 4. The front edges of the top and bottom of the outer member A are bent upon themselves to form open beads or channels 8 and 9 in which are slidably received the front edges of the top and bottom portions of the inner telescopic member B whereby the length of the device may be adjusted to accommodate it to the width of the door, as will be hereinafter more fully explained. The outer end of each section or member of the holder is provided with a suspending eye 10 projecting from the back of the member in substantial parallelism with the flat bottom 1. Of course the inner ends of the members are open so that they can telescope, but the outer ends of the members are closed by end walls, one of the end walls having an opening 11 therein for the introduction of moth balls or other insect repellent matter, a suitable cover 12 being provided for closing the opening. As shown in the drawings the cover is in the form of a plate pivoted at 13 to the adjacent end of the holder so that it may be swung into closed and open positions.

In using the device in the manner shown in Figure 2 of the drawings, the device, after being charged with moth balls or other insect repellant substance, is placed upon the floor 14 of the closet so as to rest upon the flat bottom 1 of the device with the open front of the device adjacent the closet door 15, whereby the fumes or gas arising from the said insect repellant substance will be deflected by the curved back wall of the device and pass outwardly through the open front thereof into the crack or space beneath the bottom edge of the door, thereby effectually maintaining a gas seal for the space between the bottom edge of the door and floor. When moths or other insects approach at the bottom edge thereof, they will encounter the gas or fumes filling the space below the door and also passing into the room and will be repelled thereby, so that the moths or other insects will not enter the closet. Of course some of the gas or fumes will rise within the closet and be taken up by the apparel or other materials stored therein, so that the device not only gas seals the entrance through which moths or other insects normally pass into a closet, but the garments or other materials contained within the closet are saturated with the gas or fumes.

Another way to use the device is to secure it to the inner side of the door, as for instance in the manner shown in Figure 3 of the drawings, the device being hung on the door by means of the suspending eyes 10 which may be engaged with hooks, nails or other fastenings 16 driven or otherwise set into the door, the flat portion 1 of the device lying against the door with the perforate side of the device facing downwardly so that the gas or fumes passing out of the device may enter the space between the bottom of the door and the floor and thus produce a gas seal therein.

It is of course apparent that if for any reason it is not desired to use the device adjacent the bottom edge of the closet door as described, the device may be hung upon any portion of the closet by means of any one or more of the eyes 10 so that the gas or fumes may pass out of the device and mingle with the apparel or other articles contained within the closet.

What is claimed is:

1. The herein described method of excluding moths or other insects from closets which consists in maintaining the space or crack between the bottom edge of the door and the floor of the closet sealed with a gas that is obnoxious to said insects.

2. The herein described method of excluding moths or other insects from closets which consists in maintaining within a closet adjacent the crack or space beneath the bottom edge of the closet door fume or gas producing material and directing the gas or fumes into the space between the bottom edge of the closet door and the floor.

3. The combination with a closet, of means located within the closet adjacent the bottom edge of the door and containing material for giving off gas or fumes obnoxious to moths or other insects and provided with means for directing the flow of such gas or fumes into the space between the bottom edge of the door and the floor of the closet.

4. The combination with a closet, of means for excluding moths or other insects therefrom comprising a holder for containing material capable of giving off gas or fumes obnoxious to said insects, said device resting upon the floor of the closet adjacent the door and provided with a perforate front located adjacent the door, and also provided with back and top walls arching upwardly and forwardly from the rear of the bottom of the holder to the top of the front thereof.

5. The combination with a closet, of means for excluding moths or other insects therefrom, comprising a holder secured to the inner side of the door adjacent the lower edge thereof for containing material capable of giving off gas or fumes obnoxious to said insects, the bottom of the holder being perforate and located at or adjacent the lower edge of the door.

6. A holder for moth or other insect repellant material comprising telescopic sections, each section having a flat bottom, a perforate front and a combined back and top wall arching upwardly and forwardly from the rear of the bottom of the section to the top of the front thereof, one end of the device having a filling opening and a closure therefor, and the other end being closed.

7. A holder for moth or other insect repellant material comprising telescopic sections, each section having a flat bottom, a perforate front and a combined back and top wall arching upwardly and forwardly from the rear of the bottom of the section to the top of the front thereof, one end of the device having a filling opening and a closure therefor and a suspending eye provided at the outer end of each section and extending rearwardly from the back thereof in the general direction of the plane of the bottom of the device.

ELLIOTT R. CARPENTER.